United States Patent
Lien et al.

(10) Patent No.: US 9,247,178 B2
(45) Date of Patent: Jan. 26, 2016

(54) DISPLAY DEVICE USED AS DEMONSTRATION DEVICE

(71) Applicant: HON HAI PRECISION INDUSTRY CO., LTD., New Taipei (TW)

(72) Inventors: Chih-Huang Lien, Hsinchu (TW); Chen-Jung Fang, New Taipei (TW); Hui-Ting Shen, Hsinchu (TW); Chin-Chou Lin, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/484,226

(22) Filed: Sep. 11, 2014

(65) Prior Publication Data

US 2015/0070584 A1 Mar. 12, 2015

(30) Foreign Application Priority Data

Sep. 12, 2013 (TW) .............................. 102133057 A

(51) Int. Cl.
| | |
|---|---|
| *H04N 5/44* | (2011.01) |
| *G06F 3/0354* | (2013.01) |
| *G06F 3/038* | (2013.01) |
| *H04N 5/445* | (2011.01) |

(52) U.S. Cl.
CPC .............. *H04N 5/4403* (2013.01); *G06F 3/038* (2013.01); *G06F 3/03545* (2013.01); *H04N 2005/4412* (2013.01); *H04N 2005/4428* (2013.01); *H04N 2005/44573* (2013.01)

(58) Field of Classification Search
CPC ............ H04N 7/15; H04N 2005/4412; H04N 2005/4428; H04N 2005/44573; H04N 5/4403; H04N 5/4401; H04N 5/44543; H04N 5/44513; G06F 3/03545; G06F 3/038; G06F 3/0383; G09B 5/065; G09B 5/08
USPC ........ 348/552–554, 723, 725; 725/67, 68, 98, 725/100, 118, 131, 133, 139, 141, 148, 151, 725/153; 345/173, 179, 169
IPC ............................................... H04N 5/44, 5/38
See application file for complete search history.

(56) References Cited

U.S. PATENT DOCUMENTS

| | | | |
|---|---|---|---|
| 8,723,820 B1 * | 5/2014 | Han .................... | G06F 3/03545 345/173 |
| 2007/0106950 A1 * | 5/2007 | Hutchinson ............ | G09B 5/067 345/1.1 |

* cited by examiner

*Primary Examiner* — Sherrie Hsia
(74) *Attorney, Agent, or Firm* — Novak Druce Connolly Bove + Quigg LLP

(57) ABSTRACT

A demonstration device includes a handheld terminal and a receiving terminal. The handheld terminal includes a mode switch key, and a first micro control unit. The mode switch key can generate a mode switch trigger signal to change from TV signal mode for example, to whiteboard mode. The receiving terminal includes a second micro control unit, and a mode switch executing unit. The second micro control unit can receive the mode switch control signal, and the mode switch executing unit can switch the receiving terminal from TV signal mode to a whiteboard mode according to the mode switch control signal. The receiving terminal draws a picture with lines of particular colors and widths according to movements of the handheld terminal when held in a user's hand.

20 Claims, 2 Drawing Sheets

DISPLAY DEVICE USED AS DEMONSTRATION DEVICE

CROSS-REFERENCE TO RELATED APPLICATIONS

This application claims priority to Taiwanese Patent Application No. 102133057 filed on Sep. 12, 2013 in the Taiwan Intellectual Property Office, the contents of which are hereby incorporated by reference.

FIELD

The disclosure generally relates to displays.

BACKGROUND

Television has a signal function to display media. A whiteboard function can be integrated into the television, so that a user can illustrate objects by drawing pictures of the object through the television.

BRIEF DESCRIPTION OF THE DRAWINGS

Many aspects of the embodiments herein can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

Figure 1:
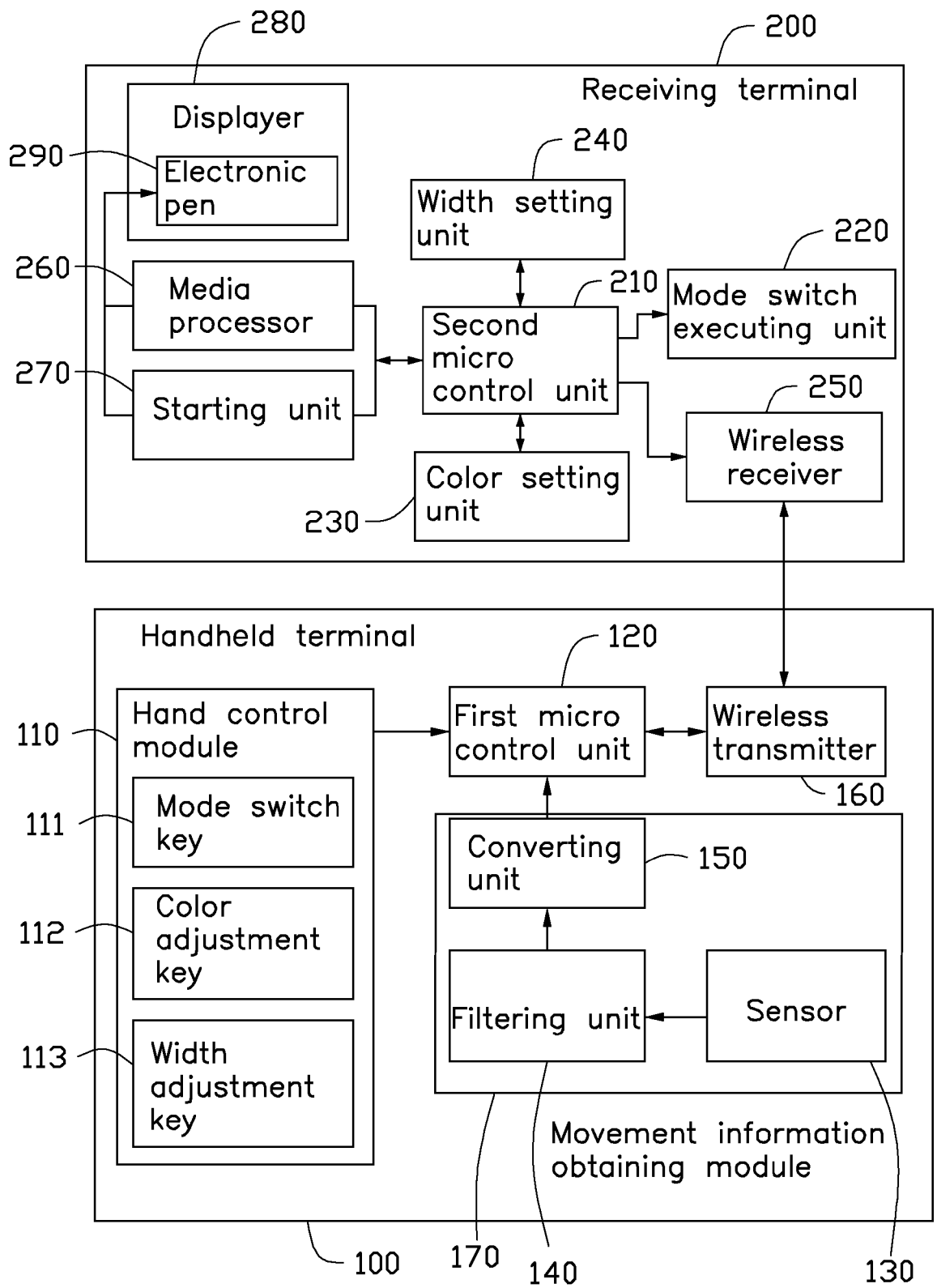
FIG. 1 is a block diagram of one embodiment of a demonstration device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In general, the word "module," as used herein, refers to logic embodied in hardware or firmware, or to a collection of software instructions, written in a programming language such as Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media are compact discs (CDs), digital versatile discs (DVDs), Blu-Ray discs, Flash memory, and hard disk drives. The term "coupled" is defined as connected, whether directly or indirectly through intervening components, and is not necessarily limited to physical connections. The connection can be such that the objects are permanently connected or releasably connected.

FIG. 1 illustrates a demonstration device of one embodiment. The demonstration device can include a handheld terminal 100 and a receiving terminal 200 coupled to the handheld terminal 100. The receiving terminal 200 can work in a TV mode and in a whiteboard mode. When in the TV mode, the receiving terminal 200 can play media, such as videos, pictures, audios, and other data. When in the whiteboard mode, the receiving terminal 200 can display a picture according to movement information of the handheld terminal 100. In at least one embodiment, the handheld terminal 100 is a remote control, and the receiving terminal 200 is a television.

The handheld terminal 100 can include a hand control module 110, a first micro control unit 120, a wireless transmitter 160, and a movement information obtaining module 170. The hand control module 110 can include a mode switch key 111. The movement information obtaining module 170 can include a sensor 130, a filtering unit 140, and a converting unit 150. The sensor 130 can be coupled to the filtering unit 140, and the filtering unit 140 can be coupled to the converting unit 150.

The receiving terminal 200 can include a second micro control unit 210, a mode switch executing unit 220, a wireless receiver 250, a media processor 260, a starting unit 270, and a displayer 280. The mode switch executing unit 220 and the wireless receiver 250 are coupled to the second micro control unit 210. The media processor 260 can be connected to the second micro control unit 210 with the displayer 280. The starting unit 270 can be connected to the second micro control unit 210 with the displayer 280.

The mode switch key 111 can generate a mode switch trigger signal, and the first micro control unit 120 can send a mode switch control signal after receiving the mode switch trigger signal via the wireless transmitter 160. The second micro control unit 210 can receive the mode switch control signal via the wireless receiver 250, and the mode switch executing unit 220 can switch the receiving terminal 200 to the whiteboard mode. The starting unit 270 can activate an electronic pen 290.

When the receiving terminal 200 is in the whiteboard mode, the sensor 130 can track the movements (movement trails) of the handheld terminal 100 and send analog voltage signals according to the movement trails. Each movement trail has an analog voltage signal. The filtering unit 140 can filter the analog voltage signals to filter noise signal or high-frequency signal and send the filtered analog voltage signals. The converting unit 150 can convert the filtered analog voltage signals to digital voltage signals. The first micro control unit 120 can convert the digital voltage signals to movement characteristics and send the movement characteristics to the second micro control unit 210 via the wireless transmitter 160 and the wireless receiver 250. The media processor 260 can move the electronic pen 290 to draw a picture in the player 280 according to the movement characteristics.

In at least one embodiment, the hand control module 110 can further include a color adjustment key 112 and a width adjustment key 113. The receiving terminal 200 can further include a color setting unit 230 and a width setting unit 240. The color setting unit 230 and the width setting unit 240 are coupled to the second micro control unit 210.

The color adjustment key 112 can generate a color adjustment trigger signal, and the first micro control unit 120 can send a color adjustment control signal after receiving the color adjustment trigger signal. The color setting unit 230 is configured to set the colors of lines of the picture after receiving the color adjustment control signal. The width adjustment key 113 can generate a width adjustment trigger signal and the first micro control unit 120 can send a width adjustment control signal after receiving the width adjustment trigger signal. The width setting unit 240 can set the widths of lines of the picture.

Figure 2:
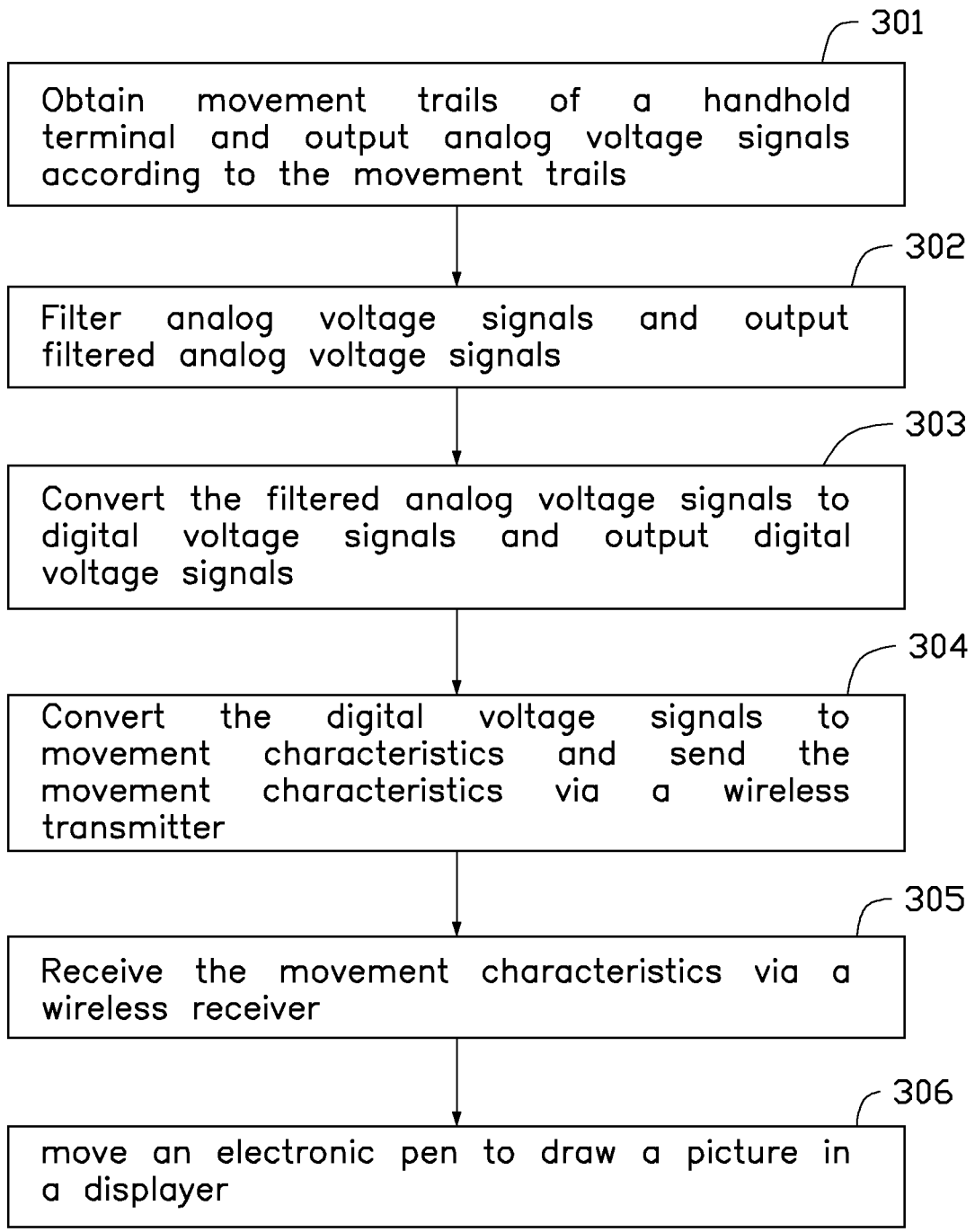
FIG. 2 is a flowchart of a method for drawing pictures.

FIG. 2 illustrates a method of drawing a picture when a receiving terminal is in a whiteboard mode, the method comprises the following blocks.

In block 301, a sensor can obtain movement trails of a handheld terminal and output analog voltage signals according to the movement trails.

In block 302, a filtering unit can filter analog voltage signals and output filtered analog voltage signals.

In block 303, a converting unit can convert the filtered analog voltage signals to digital voltage signals.

In block 304, a first micro control unit can convert the digital voltage signals to movement characteristics and transmit the movement characteristics via a wireless transmitter.

In block 305, a second micro control unit can receive the movement characteristics via a wireless receiver.

In block 306, a media processor can move an electronic pen to draw a picture in a displayer according to the movement trails.

Certain steps or methods described herein can be removed, others can be added, and the sequence of steps can be altered. The description and the claims drawn for or in relation to a method may give some indication in reference to certain steps. However, any indication given is only to be viewed for identification purposes, and is not necessarily a suggestion as to an order for the steps.

The embodiments described herein are illustrative, and should not be construed as limiting the following claims.

What is claimed is:

1. A demonstration device comprising:
   a handheld terminal comprising:
      a hand control module comprising a mode switch key configured to generate a mode switch trigger signal;
      a first micro control unit coupled to the hand control module and configured to send a mode switch control signal via a wireless transmitter upon receiving the mode switch trigger signal; and
   a receiving terminal coupled to the handheld terminal, the receiving terminal comprising:
      a second micro control unit and configured to receive the mode switch control signal via a wireless receiver; and
      a mode switch executing unit configured to switch the receiving terminal to a whiteboard mode according to the mode switch control signal;
   wherein the receiving terminal is configured to draw a picture according to movement information of the handheld terminal when the receiving terminal is in the whiteboard mode.

2. The demonstration device of claim 1, wherein the handheld terminal further comprises a movement information obtaining module; the receiving terminal further comprises an electronic pen; the movement information obtaining module is configured to obtain movement information of the handheld terminal and output the movement information to the first micro control unit; the first micro control unit is configured to convert the movement information to movement characteristics and send the movement characteristics to the receiving terminal; and the second micro control unit is configured to move the electronic pen according to the movement characteristics.

3. The demonstration device of claim 2, wherein the movement information obtaining module comprises a sensor configured to obtain movement trails of the handheld terminal and output analog voltage signals according to the movement trails.

4. The demonstration device of claim 3, wherein the movement information obtaining module further comprises a filtering unit couple to the sensor configured to filter the analog voltage signals and output the filtered analog voltage signals.

5. The demonstration device of claim 4, wherein the movement information obtaining module further comprises a converting unit coupled to the filtering unit, and the converting unit is configured to convert the filtered analog voltage signals to digital voltage signals and output the digital voltage signals, and the first micro control unit is configured to convert the digital voltage signals to the movement characteristics.

6. The demonstration device of claim 3, wherein the sensor is a three axis acceleration sensor.

7. The demonstration device of claim 3, wherein the filtering unit is an active low-pass filter.

8. The demonstration device of claim 2, wherein the receiving terminal further comprises a media processor coupled to the second micro control unit and a displayer, and the media processor is configured to move the electronic pen to draw the picture in the displayer according to the movement characteristics.

9. The demonstration device of claim 8, wherein the hand control module further comprises a color adjustment key; the receiving terminal further comprises a color setting unit; the color adjustment key is configured to send a color adjustment trigger signal; the first micro control unit is configured to send a color adjustment control signal after receives the color adjustment trigger signal; and the color setting unit is configured to set the color of lines of the picture.

10. The demonstration device of claim 8, wherein the hand control module further comprises a width adjustment key; the receiving terminal further comprises a width setting unit; the width adjustment key is configured to send a width adjustment trigger signal; the first micro control unit is configured to send a width adjustment control signal after receives the width adjustment trigger signal; and the width setting unit is configured to set the width of lines of the picture.

11. A demonstration device comprising:
   a handheld terminal comprising:
      a mode switch key configured to generate a mode switch trigger signal; and
      a first micro control unit coupled to the mode switch key and configured to send a mode switch control signal via a wireless transmitter upon receiving the mode switch trigger signal;
   a receiving terminal coupled to the handheld terminal, the receiving terminal comprising:
      a second micro control unit and configured to receive the mode switch control signal via a wireless receiver; and
      a mode switch executing unit configured to switch the receiving terminal to a whiteboard mode according to the mode switch control signal; and
      an electronic pen;
   wherein the electronic pen is configured to draw a picture according to movement information of the handheld terminal when the receiving terminal is in the whiteboard mode.

12. The demonstration device of claim 11, wherein the handheld terminal further comprises a movement information obtaining module configured to obtain movement information of the handheld terminal and send the movement information to the first micro control unit, the first micro control unit is configured to convert the movement information to movement characteristics and send the movement characteristics to the receiving terminal; and the second micro control unit is configured to move the electronic pen according to the movement characteristics.

13. The demonstration device of claim 12, wherein the movement information obtaining module comprises a sensor configured to obtain movement trails of the handheld terminal and output analog voltage signals according to the movement trails.

14. The demonstration device of claim 13, wherein the movement information obtaining module further comprises a filtering unit coupled to the sensor, and the filtering unit is configured to filter the analog voltage signals and output the filtered analog voltage signals.

15. The demonstration device of claim 14, wherein the movement information obtaining module further comprises a converting unit coupled to the filtering unit, and the converting unit is configured to convert the filtered analog voltage signals to digital voltage signals and output the digital voltage signals, and the first micro control unit is configured to convert the digital voltage signals to the movement characteristics.

16. The demonstration device of claim 13, wherein the sensor is a three axis acceleration sensor.

17. The demonstration device of claim 13, wherein the filtering unit is an active low-pass filter.

18. The demonstration device of claim 12, wherein the receiving terminal further comprises a media processor coupled to the second micro control unit and a displayer, and the media processor is configured to move the electronic pen to draw the picture in the displayer according to the movement characteristics.

19. The demonstration device of claim 18, wherein the handheld terminal further comprises a color adjustment key; the receiving terminal further comprises a color setting unit; the color adjustment key is configured to generate a color adjustment trigger signal; the first micro control unit is configured to send a color adjustment control signal after receives the color adjustment trigger signal; and the color setting unit is configured to set the color of lines of the picture.

20. The demonstration device of claim 18, wherein the handheld terminal further comprises a width adjustment key; the receiving terminal further comprises a width setting unit; the width adjustment key is configured to send a width adjustment trigger signal; the first micro control unit is configure to send a width adjustment control signal after receives the width adjustment trigger signal; and the width setting unit is configured to set the width of lines of the picture.

* * * * *